United States Patent [19]

Häusler et al.

[11] 4,320,444
[45] Mar. 16, 1982

[54] CONTROL OF A HVT (HIGH VOLTAGE d-c TRANSMISSION) SHORT COUPLER

[75] Inventors: Michael Häusler; Kadry Sadex, both of Hirschberg, Fed. Rep. of Germany

[73] Assignee: Brown, Boveri & Cie AG, Mannheim-Kafertal, Fed. Rep. of Germany

[21] Appl. No.: 110,694

[22] Filed: Jan. 9, 1980

[30] Foreign Application Priority Data

Jan. 13, 1979 [DE] Fed. Rep. of Germany ....... 2901263

[51] Int. Cl.³ .............................................. H02J 3/36
[52] U.S. Cl. ........................................ 363/35; 363/51
[58] Field of Search ................. 363/35, 37, 51, 78–79, 363/85, 96; 361/86, 91, 117–118

[56] References Cited

U.S. PATENT DOCUMENTS

| | | | |
|---|---|---|---|
| 3,395,327 | 7/1968 | Kaiser et al. | 363/35 |
| 3,949,291 | 4/1976 | Kanngiesser et al. | 363/35 |
| 3,992,659 | 11/1976 | Ekstrom | 363/51 |
| 4,015,170 | 3/1977 | Barakaev et al. | 363/51 |

OTHER PUBLICATIONS

G. Pressler, "Regelungstechnik", B. I. Hochschultaschenbücher 63/63a, Bibliographisches Institut, Mannheim, 1967, pp. 156–159.
W. Oppelt, "Kleines Handbuch Technischer Regelvorgänge", 1972, Verlag Chemie, Weinheim, p. 489.
V. D. Kluge, "Regelungeiner Hochspannungs-Gleichstrom-Übertragung beiverschiedenen Anwendungsmöglichkeiten", BBC Nachrichten, Oct./Nov. 1970, pp. 295–302.

Primary Examiner—William M. Shoop
Assistant Examiner—Peter S. Wong
Attorney, Agent, or Firm—Herbert L. Lerner; Laurence A. Greenberg

[57] ABSTRACT

Method for controlling a high-voltage d-c (HVDC) transmission installation with a short coupler according to the marginal current method, which includes levelling out voltage variations of longer than a given duration in the three-phase voltages at terminals of the short coupler with step switches of the converter transformers, and controlling the invertor to form a constant control angle.

4 Claims, 1 Drawing Figure

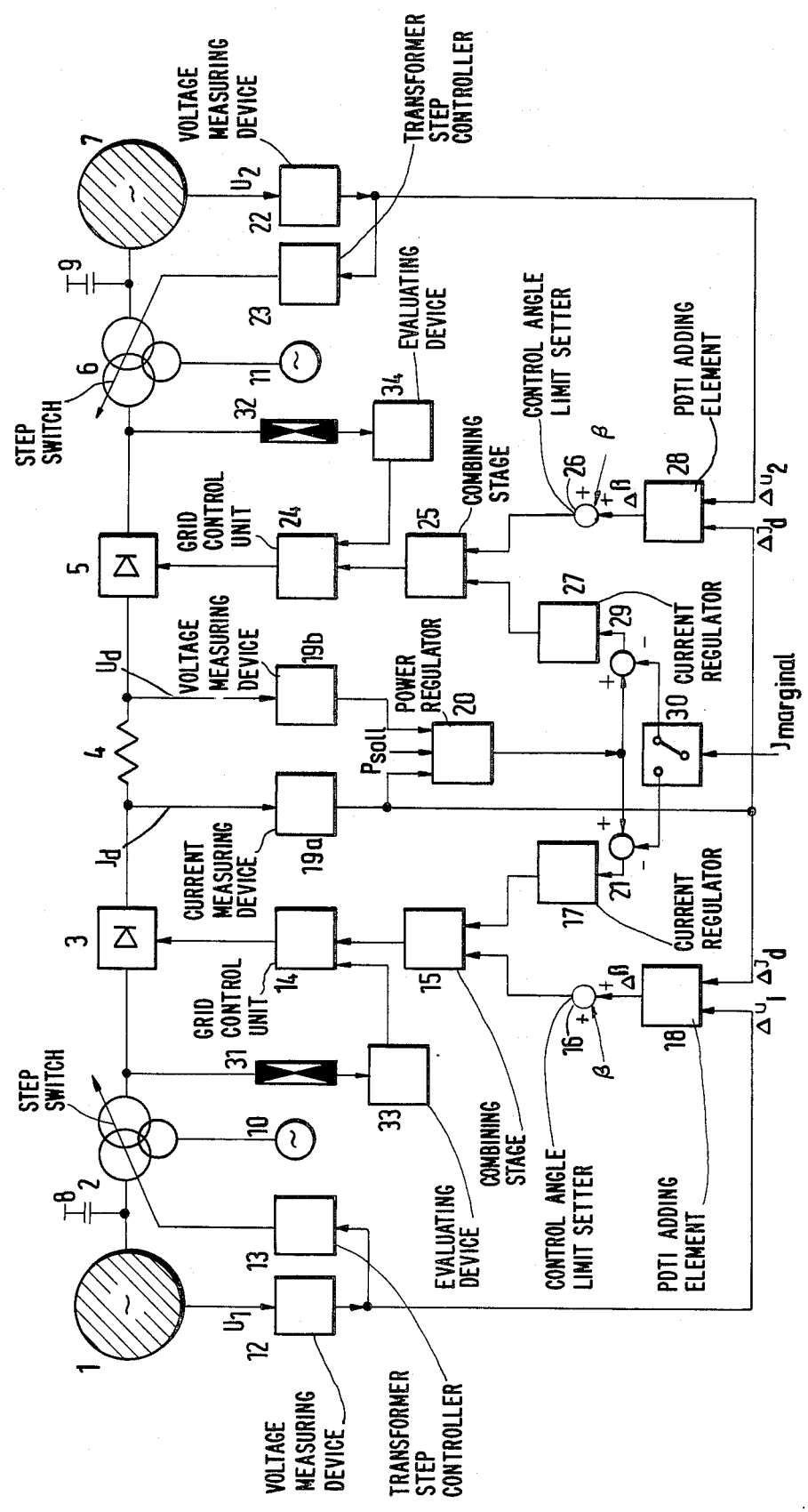

CONTROL OF A HVT (HIGH VOLTAGE d-c TRANSMISSION) SHORT COUPLER

The invention relates to a method for controlling a high-voltage d-c transmission (HVDC) installation with construction of a short coupler according to the marginal-current method.

For a number of typical possible applications, d-c offers a true alternative to conventional a-c transmission. One of these possible applications to an HVDC network coupler, which is known, for instance, from "Brown Boveri Mitteilungen" 9/78, pages 573 to 577. An HVDC short coupler is understood to be a network coupler, in which the rectifier and the inverter are installed in the same substation, i.e., without a d-c overhead line. An HVDC short coupler can generally connect three-phase networks of equal or different frequency asynchronously. This advantageously avoids stability problems, and fast and accurate control of the transferred power and the voltage in the connected three-phase networks is possible. Furthermore, connecting the two networks together does not increase the short-circuit power.

Generally, HVDC network couplers are controlled according to the marginal-current method with control for a minimum quenching angle in the inverter over the entire load range, in order to obtain a minimum of reactive power and thereby to also obtain minumum losses and harmonic currents. A method that has been developed beyond the generally known methods is described in German Published, Non-Prosecuted Application DE-OS No. 19 62 042 and is aimed at changing the d-c current and the d-c voltage simultaneously for influencing the reactive power. Control of the power factor cos $\phi$=const can thereby be realized (see in this connection also BBC-Nachrichten Oct./Nov. 1970, pages 295 to 302, especially page 298).

The known arrangement has the disadvantage that the requirements as to the control equipment that must be made available are considerable.

It is accordingly an object of the invention to provide a method and device for controlling high-voltage d-c (HVDC) transmission installation which overcomes the hereinbefore mentioned methods of this general type, and by means of which the requirements as to the necessary control equipment are reduced as compared to the known methods, while an advantageous control behavior is to be achieved in spite of these simplifications.

With the foregoing and other objects in view there is provided, in accordance with the invention, a method for controlling a high-voltage d-c (HDVC) transmission installation with a short coupler according to the marginal current method, which comprises levelling out voltage variations of longer than a given duration in the three-phase voltages at terminals of the short coupler with step switches of the converter transformers, and controlling the inverter to form a constant control angle.

In accordance with another mode of the invention, there is provided a method which comprises cutting-off grid controls of the rectifier and inverter after overvoltage arresters have responded, for over-voltages of shorter than the given duration.

In accordance with a further mode of the invention, there is provided a method which comprises correcting the control angle in dependence on changes of the three-phase voltage and on changes of the load current through a PDT1-adding member.

In accordance with an added mode of the invention, there is provided a method which comprises setting a steady-state constant quenching angle in the event of an overload.

In accordance with an additional mode of the invention, there is provided a method which comprises increasing the quenching angle for transients.

In accordance with a concomitant feature of the invention, there is provided a device for controlling a high-voltage d-c (HVDC) transmission installation with a short coupler according to the marginal current method, comprising terminals for the short coupler, converter transformers connected to three-phase networks, an invertor connected to one of said converter transformers, means including step switches of the converter transformers for levelling out voltage variations of longer than a given duration in the three-phase voltages at the terminals of the shorter coupler, and means for controlling the inverter to form a constant control angle.

The advantages obtainable with the invention comprise in particular the feature that the converter valves of the rectifiers and inverters are optimally utilized as to their breakdown strength without being overstressed. The transformer step switches are advantageously operated only rarely and therefore, the maintenance intervals for the step switches can be increased as compared to load-current-dependent control principles. In addition, the complicated quenching angle measurement can advantageously be omitted. Further advantages are evident from the specification.

Other features which are considered as characteristic for the invention are set forth in the appended claims.

Although the invention is illustrated and described herein as embodies in a method and device for controlling a high-voltage d-c (HVDC) transmission installation with a short coupler, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a schematic circuit diagram of an HVDC coupler with its associated control arrangement.

Referring now to the FIGURE of the drawing, there is seen an HVDC short coupler which connects two three-phase networks together. A first three-phase network 1 is connected to a second three-phase network 7 through a first converter transformer 2 with a step switch, a first converter 3, a smoothing choke 4, a second converter 5 and a second converter transformer 6 with a step switch. Since the HVDC short coupler is supposed to be suitable for energy transport in both directions, i.e., from network 1 to network 7 or from network 7 to network 1, the converters 3 and 5 can be used as rectifiers as well as inverters, depending on the direction of the energy flow required. The converters 3 and 5 are advantageously of 12-pulse construction and are connected to the associated converter transformers in a suitable manner.

A first capacitor battery 8 is connected to the first three-phase network 1 and a second capacitor battery 9 is connected to the second three-phase network 7. A first reactive-power machine or phase shifter 10 is connected to a tertiary winding of the first converter transformer 2. Similarly, a second reactive-power machine or phase shifter 11 is connected to a tertiary winding of the second converter transformer 6.

The capacitor batteries 8 and 9 as well as the reactive-power machines 10 and 11 are not absolutely necessary components of the HVDC short coupler, but they serve in an advantageous manner for influencing the reactive-load behavior of the mutually connected three-phase networks 1 and 7. If the HVDC short coupler is not equipped with reactive-power machines 10 and 11, the associated converter transformers 2 and 6 have two windings and not three windings.

A voltage measuring device 12 serves for determining the voltage $U_1$ of the three-phase network 1. On the output side, the voltage measuring device 12 is connected to a transformer step controller 13 associated with the converter transformer 2. A grid control unit 14 influences the first converter 3 which is connected to the output side thereof on the input side, the unit 14 is addressed through a combining stage 15, a control-angle limit setter 16 and a current regulator 17. The control-angle limit setter 16 sets-in the control angle $\beta$ and is acted upon by a control-angle change value $\Delta\beta$ through a PDT1-adding superposition element 18.

Applied to the adding element 18 on the input side thereof are the voltage value $\Delta U_1$ of the voltage measuring device 12 as well as the current value $\Delta I_d$ of a current measuring device 19a for determining the d-c current $\Delta I_d$. The control-angle limit setter 16 as well as the PDT1-adding element 18 are necessary for the converter 3 of an HVDC short coupler only if the converter 3 is also to operate as an inverter, i.e., if a reversael of the energy flow is provided.

The output signal of the current measuring device 19a is further fed to a power regulator 20, to the input of which are further fed a power reference value $P_{so11}$ as well as the signal of a voltage measuring device 19b for determining the d-c voltage $U_d$. The output value of the power regulator 20 is fed to the current controller or regulator 17 through a summing point 21.

Analogously to the hereinafore described control arrangement for the first converter 3 of the HVDC short coupler, the second converter 5 has a control arrangement of identical construction. The output signal of a voltage measuring device 22, for determining the voltage $U_2$ of the three-phase network 7 is fed to a transformer step, controller 23 associated with the second converter transformer 6. The second converter 5 is addressed by means of a grid control unit 24, to the input of which the control angle $\beta$ of a control-angle limit setter 26 and the output value of a current regulator 27 are fed, through a combining element or stage 25.

The setter 26 is addressed by the control-angle change value $\Delta\beta$ of a PDT1-adding member 28, to the input side of which are applied the voltage value $\Delta U_2$ of the voltage measuring device 22 as well as the current value $\Delta I_d$ of the current measuring device 19a.

The current regulator 27 receives output signals of the power regulator 20 through a summing point 29. The summing points 21 and 29 can be addressed through a double-throw switch 30 by a negative marginal-current signal $I_{Marginal}$. Depending on the position of the double-throw switch 30, a current value reduced by the marginal current value $I_{Marginal}$ is therefore selectively fed to one of the two current regulators 17 or 27.

Between the converter transformers 2 and 6, respectively, and the converters 3 and 5, respectively, assigned to them, over-voltage arrestors 31 and 32 are connected. With each of the arresters 31 and 32, an evaluating device 33 and 34, respectively, is associated. Each of the evaluating devices 33, 34 is connected on the output side thereof to the corresponding grid control Unit 14 or 24, respectively.

After this description of the HVDC short coupler of the embodiment example and its control arrangement, the operation of the arrangement will now be described hereinbelow.

Variations of longer duration of the voltages $U_1$ or $U_2$ of the three-phase networks 1 and 7, at the terminals of the short coupler, are determinded by the voltage measuring devices 12 and 22 and fed to the transformer step controllers 13 and 23, respectively. The voltage fluctuations of longer duration are then levelled out by the step switches of the converter transformers 2 and 6. Contrary to the generally known control methods used heretofore, no additional variables such as a d-c voltage or a control angle range need be controlled by the step switches of the transformers. Because they have the sole purpose of levelling voltage fluctuations of longer duration, the transformer stepping switches are advantageously relatively rarely actuated, and furthermore, the required step switch range can be reduced.

If dangerous brief overvoltages occur, the valves of the converters 3 and 5 are cut off by their corresponding grid controls 14 and 24, respectively, and the current $I_d$ brought to zero, whereby the voltage stress is reduced $\sqrt{3}$-times. As the criterion for the presence of dangerous brief overvoltages, the response of the over-voltage arresters 31 and 32 is utilized. If one of the overvoltages arresters 31 or 32 responds repeatedly at short intervals, an intervention into the grid controls 14 and 24 takes place by way of the corresponding evaluation devices 33 and 34, respectively. In this manner, the valves of the converters 3 and 5 are protected from dangerous brief overvoltages of up to $\sqrt{3}$-times the nominal voltage.

The well-known marginal-current method (see in this connection, for instance, BBC-Nachrichten, Oct./Nov. 1970, pages 295 to 302) is used in conjunction with control of the inverter to a control angle $\beta$ = constant, as long as the current regulator of the inverter is not actively engaged. The construction is such that in nominal operation, the nominal quenching angle is reached.

It is assumed in the embodiment example under consideration that the converter 3 operates as a rectifier and the converter 5 as an inverter. In that case, a negative marginal current value $I_{Marginal}$, which decreases the current reference value given to the current regulator 27 by the power regulator 20, is fed to the summing point 29 through the double-throw switch 30.

The power controller 20 determines the value of the power from the d-c current $I_d$, determined by the current measuring device 19a and from the d-c voltage $U_d$, determined by the voltage measuring device 19b; compares this actual value with a predetermined reference value $P_{so1}$; and determines a current reference value therefrom. The instantaneous value of the power can also be determined on the three-phase side.

The current reference value is fed to the current regulator 17 at an undiminished level, in the present embodiment example. The grid control Unit 14 which supplies the valves of the converter 3, operating as a rectifier, with appropriate firing pulses, are addressed through the combining stage 15. The control angle limit setter 16 as well as the PDT1 adding element 18 remain inoperative when the converter 3 operates as a rectifier.

In the illustrated position of the double-throw switch 30, the current regulator 27 of the converter 5, operating as an inverter, likewise remains inoperative. The valves of the convertor 5 are addressed through the control-angle limit setter 26, the combining stage 25 and the grid control Unit 24.

The reactive-load behavior of the inverter and the rectifier is influenced favorably with this method of operation; more specifically, the change of the reactive power, when the coupler power is lowered, is smaller than with control to minimum quenching angle (conventional method). This decreases the number of switching actions for compensating the reactive converter power by means of switchable capacitors (8,9). This is desirable in view of the service life of the switches.

The reactive-power behavior and the power factor cos $\phi$, respectively, are influenced in the embodiment example under consideration by the reactive-power machines 11 and 10 and/or by the capicitor battery 8 and 9, respectively.

In order to insure that the short coupler can also be operated in the event of an overload without exceeding the permissible quenching angle $\gamma$, a characteristic curve $\beta = f(I,U)$ is preset. The calculated shape thereof results in a constant quenching angle $\gamma = \beta - \mu$, $\mu$ being the overlap angle. In the case of transients, the quenching angle is increased. Interference quantities which must be taken into consideration here are the deviations of the three-phase voltage in the inverter network ($U_2$ in the embodiment example), as well as changes of the load current $I_d$. Combining both interference quantities, i.e., adding $\Delta\beta$ depending on the interference quantities, is accomplished through a PDT1-adding stage 18 or 28, respectively.

The addition of $\Delta\beta = f(\Delta U, \Delta I_d)$ can be provided through only one amplifier, avoiding an expensive computing circuit. The basically nonlinear relation $\Delta\beta = f(\Delta U)$ is linearized here. The same applies for the relation $\Delta\beta = f(\Delta I_a)$, where the interference variable $\Delta I_d$ is obtained as the difference between the actual current and the nominal current (only positive values being considered). By this addition through the PDT1-adding member, the desired steady-state characteristic $\beta = f(I_d)$ at overload is also achieved. The overdrive when the current rises, contributes substantially to the stabilization of the operation (=avoidance of flipping).

Furthermore, in case of heavy breaks in the three-phase voltage after preceding nominal operation, stable operation of the short coupler can be achieved after only one to two flips.

The changes of the three-phase voltage are detected for the transformer step control anyway, so that no extra cost is connected with this supplemental addition.

A PDT1-member is known, for instance, from the book by W. Oppelt, "klienes Handbuch technischer Regelvorgänge", 5th Ed., 1972, Verlag Chemie, Weinheim, page 489.

There are claimed:

1. Method for controlling a high-voltage d-c (HVDC) transmission installation having a short coupler, including a first rectifier converter station having current control gates, a first current converter transformer connected to the first rectifier converter station, a first three-phase current network connected to the HVDC installation and to the first current converter transformer, a second converter station having current control gates, a second current converter transformer connected to the second converter station, a second three-phase current network connected to the HVDC installation and to the second current converter transformer, two grid control units each
   connected to one of the converter stations for controlling the current control gates thereof, two current regulators each being connected to one of the grid control units, means for supplying a current value to each current regulator, the current regulator connected to the grid control unit of the second converter station being supplied a nominal current value which is less than the current value supplied to the current regulator connected to the grid control unit of the first converter station by a given marginal current wherein the improvement comprises providing step switches in the current converter transformers exclusively for regulating voltage fluctuations of the three-phase networks, controlling the second converter station with a constant settable control angle, and regulating voltage fluctuations of the three-phase networks lasting longer than a given duration with the step switches.

2. Method according to claim 1, which comprises correcting the control angle in dependence on voltage changes of the three-phase networks and in dependence on changes of the load current with PDT1-adding members.

3. Device for controlling a high-voltage d-c (HVDC) transmission installation having a short coupler, including a first rectifier converter station having current control gates, a first current converter transformer connected to the first rectifier converter station, a first three-phase current network connected to the HVDC installation and to the first current converter transformer, a second converter station having current control gates, a second current converter transformer connected to the second converter station, a second three-phase current network connected to the HVDC installation and to the second current converter transformer, two grid control units each being connected to one of the converter stations for controlling the current control gates thereof, two current regulators each being connected to one of the grid control units, means for supplying a current value to each current regulator, the current regulator connected to the grid control unit of the second converter station being supplied a nominal current value which is less than the current value supplied to the current regulator connected to the grid control unit of the first converter station by a given marginal current, wherein the improvement comprising means for controlling the second converter station with a constant settable control angle, and step switches in the current converter transformers exclusively for regulating voltage fluctuations of the three-phase networks lasting longer than a given duration.

4. Device according to claim 3, including PDT1-adding members connected to the controlling means for correcting the control angle in dependence on voltage changes of the three-phase networks and in dependence on changes of the load current.

* * * * *